Aug. 17, 1943.　　　S. B. HEATH　　　2,327,039
SPRAY EVAPORATOR
Filed July 10, 1941
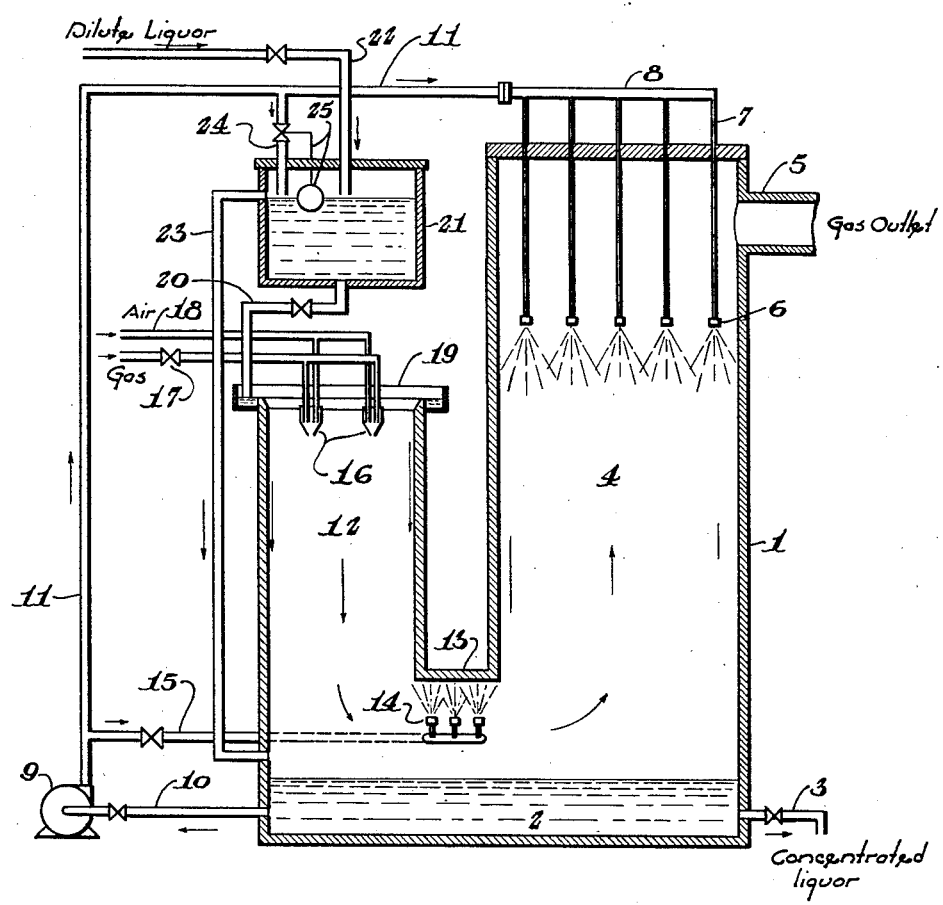
INVENTOR.
Sheldon B. Heath
BY
Griswold & Burdick
ATTORNEYS Patented Aug. 17, 1943

2,327,039

UNITED STATES PATENT OFFICE 2,327,039

SPRAY EVAPORATOR

Sheldon B. Heath, Midland, Mich., assignor to The Dow Chemical Company, Midland, Mich., a corporation of Michigan Application July 10, 1941, Serial No. 401,759

5 Claims. (Cl. 159—4)

This invention relates to an improvement in direct-fired spray evaporators.

In a number of chemical manufacturing processes the step of concentrating a dilute aqueous solution is rendered difficult by the fact that the solution, when heated in an ordinary evaporator, deposits scale on the heating surfaces to such an extent that continued operation is not feasible. In such cases, resort is often had to a direct-fired spray evaporator, in which hot combustion gases are passed directly into contact with the dilute solution in spray form, thus effecting the desired concentration by evaporating water from the individual droplets of the spray.

Unfortunately, however, because of certain inadequacies in the known forms of spray evaporators, even this method of concentrating is not readily applicable in evaporating certain solutions, which in addition to exhibiting scale-forming tendencies, contain solutes which are decomposed on exposure to high temperatures, as is the case, for instance, with strong brines containing magnesium chloride. Thus, the known spray evaporators ordinarily include, in addition to a spray tower, a separate combustion zone or chamber in which the drying gases are formed at quite high temperatures. In consequence, there is in the evaporator a small area of juncture between the hot dry combustion chamber and the spray-filled tower, which area is for the most part exposed to the full heat of the combustion gases and is only occasionally washed by spray from the tower. As a result, such of the solution being sprayed as finds its way to this area is usually evaporated all the way to dryness, forming a hard scaly deposit of solute. This deposit, in case the solute is thermally unstable, as with the magnesium chloride mentioned, often tends to decompose under the action of the hot combustion gases, forming corrosive vapors which pass into the spray tower and become dissolved in the solution being evaporated, seriously contaminating it. These and other difficulties accordingly render the use even of spray evaporators unsatisfactory in concentrating solutions of the character described.

It is, therefore, the principal object of the present invention to provide an improved direct-fired spray evaporator which is not subject to the disadvantages mentioned and which may readily and satisfactorily be employed in the concentration of scale-forming solutions of thermally unstable solutes.

This object is attained in the evaporator of the invention by the provision of positive means for disposing on the inner surfaces of the combustion chamber, as well as of the spray tower, a substantially continuous moving film of the liquor being concentrated. In this way all surfaces of the evaporator exposed to the hot combustion gases are continuously washed with solution, so that the difficulties of prior apparatus caused by overheating at the juncture between the combustion chamber and the spray tower and consequent excessive drying and decomposition of solute are avoided.

The principle of the new evaporator may be explained in detail with reference to the accompanying drawing, which illustrates in diagrammatic vertical cross-section a preferred embodiment of the invention.

As will be seen from the drawing, the evaporator body 1, of steel, brick, or other suitable material, and usually provided with external thermal insulation not shown, is formed at the base with a large reservoir 2 for concentrated liquor, the reservoir being provided with a valved outlet 3. At one side of the evaporator, and located directly above a portion of the reservoir body as an extension thereof is a closed elongated evaporating tower or spray chamber 4, which has a gas outlet 5 near its top. Within the evaporating tower 4 in the upper portion thereof but below the level of the gas outlet 5 are mounted a number of spray nozzles 6 of ordinary design fed by individual supply pipes 7 from a common header 8 above the tower. These nozzles 6 are adjusted and directed so that spray issuing therefrom fills the tower with a uniform rain of fine droplets and also so that a part of the sprayed liquor strikes the whole inner periphery of the tower at a level near that of the nozzles and thus wets all the inner surfaces of the tower with a substantially continuous film of liquor moving downwardly into the reservoir 2. Liquor to be concentrated is supplied continuously to the spray nozzles by a pump 9 which withdraws liquor from the reservoir at a point remote from the spray tower by way of an outlet pipe 10 and forces it through a connecting line 11 to the nozzle header 8.

The evaporator body also comprises an open topped combustion chamber 12 which rises parallel to the spray tower 4 and is located above another portion of the reservoir body as an extension thereof. This combustion chamber 12 and the spray tower 4 are in open communication with one another at their lower portion by way of a gas passage 13 directly above and open to the reservoir 2, the walls of the passage being wetted continuously by spray from suitably mounted nozzles 14 supplied with liquor from the pump 9 through a valved line 15.

Mounted within the combustion chamber 12 in the upper portion thereof are one or more burners 16 provided with appropriate supply lines 17 and 18 for fluid or carbonaceous fuel and for air. These burners are directed so that the flames issuing therefrom play downwardly within the chamber 14 and the hot combustion gases formed pass into partial contact with the surface of the liquor in the reservoir 2, through the gas passage 13, and thence upwardly in the evaporating tower to the outlet 5 thereof.

Closely fitting around the upper end of the combustion chamber 12 is a level shallow distributing trough 19 constructed so that a small quantity of liquor continuously overflows therefrom into the chamber 12 uniformly around the periphery thereof, thus providing on the inner walls of the combustion chamber a substantially continuous film of liquor moving downwardly into the reservoir 2. The trough 19 is fed with liquor by a valved line 20 from a storage tank 21 at a level above the trough, the tank being provided with a valved inlet 22 for dilute liquor, and an overflow pipe 23 leading into the evaporator body above the reservoir 2. If desired, the tank 21 may, as shown, also be provided with a second valved inlet 24 opening from the liquor circulating line 11 for the spray nozzles, this inlet being normally closed, but being opened by a float-control 25 if the level in the tank should fall below a predetermined value, as by momentary failure of the dilute liquor supply.

In starting the evaporator, the reservoir 2 is filled to a suitable level, the burners 16 are lighted, the pump 9 is set in operation, and the various valves adjusted. Liquor is then continuously withdrawn from the reservoir by the pump and sprayed into the tower 4, where it falls counter-current to the ascending stream of hot combustion gases, evaporating water from the individual droplets of the spray and effecting a considerable concentration of the solute. Concentrated liquor is withdrawn from the reservoir outlet 3. Fresh liquor to be evaporated is fed into the storage tank 21, from which it gradually flows into the reservoir.

By varying the adjustments on the burner, pump, and valves any desired degree of concentration within the range of the apparatus may be obtained. At high velocities of the combustion gases in the tower, traces of spray may tend to be carried out the gas outlet 5 by the escaping gases; in this event a separator, wash tower, or other recovery apparatus may be provided to treat the exit gases so as to prevent loss of valuable material.

As will be evident from the foregoing, during operation of the evaporation all inner walls are continuously covered with a film of liquor moving toward the reservoir 2. As a result, local overheating does not take place at any point; destruction of valuable solute by high temperatures does not occur; and accumulation of scaly deposits is prevented.

Other modes of applying the principle of the invention may be employed instead of those explained, change being made as regards the details described, provided the means or method stated in any of the following claims, or the equivalent thereof, be employed.

I claim:

1. In a direct-fired spray evaporator, the combination of: an evaporating tower having a gas outlet; means for injecting into the tower a spray of the liquor being concentrated; a reservoir for receiving the spray falling in the tower; a combustion zone outside but in communication with the evaporating tower and the reservoir; burner means for producing hot combustion gases in the combustion zone; and means for disposing on the inner surfaces of the evaporating tower and the combustion zone a substantially continuous film of the liquor being concentrated.

2. In a direct-fired spray evaporator, the combination of: an evaporating tower having a gas outlet; means for injecting a spray of the liquor being concentrated into the tower in the upper portion thereof; a liquor reservoir located below the tower in position to receive the spray falling therein; a combustion chamber in open communication with the reservoir and with the evaporating tower; burner means within the combustion chamber directed so that the hot combustion gases formed in the chamber pass through the evaporating tower in contact with the spray therein; and means for disposing on the inner surfaces of the evaporating tower and the combustion chamber a substantially continuous film of the liquor being concentrated.

3. In a direct-fired spray evaporator, the combination of: an evaporating tower having a gas outlet; means for injecting a spray of the liquor being concentrated into the tower in the upper portion thereof, said means being directed so that a part of the sprayed liquor wets the inner surface of the tower as a substantially continuous downwardly moving film; a liquor reservoir located below the tower in position to receive the spray and the liquor film descending therein, said reservoir having a liquor outlet; a combustion chamber in open communication with the reservoir and with the evaporating tower; burner means within the combustion chamber directed so that the hot combustion gases formed in the chamber pass downwardly into contact with the surface of the liquor in the reservoir and thence upwardly through the evaporating tower; and means for maintaining on the inner surfaces of the combustion chamber a substantially continuous moving film of the liquor being concentrated, said film moving toward the reservoir.

4. In a direct-fired spray evaporator, the combination of: a liquor reservoir provided with an outlet; an evaporating tower located directly above a portion of the reservoir body as an extension thereof, said tower having a gas outlet near its top; means for injecting a spray of the liquor being concentrated into the tower in the upper portion thereof below the gas outlet, said means being directed so that a part of the sprayed liquor wets the inner surfaces of the tower as a substantially continuous film moving downwardly into the reservoir; a combustion chamber located directly above another portion of the reservoir body as an extension thereof; a gas passage directly above the reservoir providing open communication between the combustion chamber and the evaporating tower at their lower portions; burner means within the combustion chamber directed so that the hot combustion gases formed in the chamber pass downwardly through the gas passage and thence upwardly through the evaporating tower; and means for maintaining on the inner surfaces of the combustion chamber and the gas passage a substantially continuous moving film of the liquor being concentrated.

5. In a direct-fired spray evaporator, the combination of: an evaporating tower having a gas outlet; spray nozzle means in the upper portion of said tower, said means being directed so that a part of the liquor sprayed therefrom wets the inner surface of the tower as a substantially continuous downwardly moving film; a liquor reservoir located below the tower in position to receive the spray and the liquor film descending therein, said reservoir having an outlet for concentrated liquor; a combustion chamber in open communication with the reservoir and with the evaporating tower; burner means within the combustion chamber directed so that the hot combustion gases formed in the chamber pass downwardly into contact with the surface of the liquor in the reservoir and thence upwardly through the evaporating tower; distributing means for supplying to the inner surfaces of the combustion chamber a substantially continuous moving film of dilute liquor to be concentrated, said film moving toward the reservoir; and circulating means for withdrawing liquor from the reservoir and supplying the same to the spray nozzle means in the evaporating tower.

SHELDON B. HEATH.